United States Patent [19]

Hommelet et al.

[11] Patent Number: 5,782,697
[45] Date of Patent: Jul. 21, 1998

[54] SHAFT ABUTMENT SCREW, ESPECIALLY FOR AN ELECTRIC MOTOR, AND A METHOD OF MAKING SUCH A SCREW

[75] Inventors: Stephane Hommelet; Xavier Savy. both of Chatellerault, France

[73] Assignee: Valeo Systemes D'Essuyage. La Verriere, France

[21] Appl. No.: 631,696

[22] Filed: Apr. 9, 1996

[30] Foreign Application Priority Data

Apr. 11, 1995 [FR] France .................. 95 04313

[51] Int. Cl.$^6$ ............................................. B21H 3/02
[52] U.S. Cl. ........................................ 470/8; 470/10
[58] Field of Search ......................... 470/8, 9, 10, 11, 470/66, 76; 72/348

[56] References Cited

U.S. PATENT DOCUMENTS

| | | | |
|---|---|---|---|
| 1,098,716 | 6/1914 | Garrison | 470/8 |
| 1,243,818 | 10/1917 | Cummins | 470/8 |
| 1,978,372 | 10/1934 | Purtell | 470/8 |
| 4,136,416 | 1/1979 | Thomas . | |
| 4,713,122 | 12/1987 | Dawes et al. . | |
| 5,205,466 | 4/1993 | Ker | 470/11 |
| 5,308,286 | 5/1994 | Uejima | 470/9 |

FOREIGN PATENT DOCUMENTS

| | | |
|---|---|---|
| 2 579 229 | 9/1986 | France . |
| 2 708 623 | 2/1995 | France . |
| 37 37 102 A1 | 5/1989 | Germany . |
| 62-19226 | 8/1987 | Japan .................. 470/8 |

OTHER PUBLICATIONS

Industrial Fasteners Handbook, 2nd Edition, Trade & Technical Press Limited, Morden, Surrey (UK) 1980, pp. 133, 134, table 1.

IBM Technical Disclosure Bulletin, vol. 34, No. 4A, Sep. 1991 Armonk., NY, p. 264.

French Search Report 2 Jan. 1996.

*Primary Examiner*—Lowell A. Larson
*Assistant Examiner*—Ed Tolan
*Attorney, Agent, or Firm*—Morgan & Finnegan, L.L.P.

[57] ABSTRACT

A method of making a shaft abutment screw, especially for axial engagement with an armature shaft of an electric motor, includes the following steps:

(a) pressing out a flat mild steel blank,
(b) subjecting the blank to a drawing operation so as to form a hollow component comprising a generally flat radial base wall and a generally cylindrical skirt portion extending from the base wall and describing a screw driving socket within it,
(c) machining a screw thread on the outside of the skirt portion, and then
(d) nitriding the component.

A shaft abutment screw having a flat base portion joined to an externally threaded cylindrical skirt portion, within which a hexagonal screw driving socket is formed, is also described per se. The invention is applicable especially to motorised reduction gear units for driving motor vehicle screen wipers for windshields and rear windows.

3 Claims, 2 Drawing Sheets

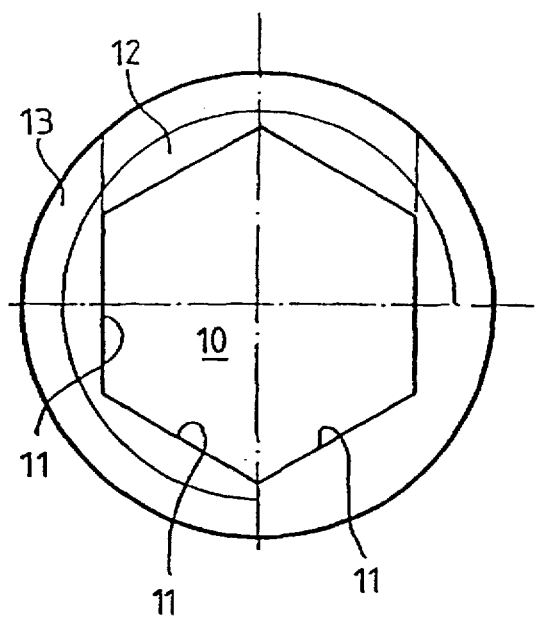
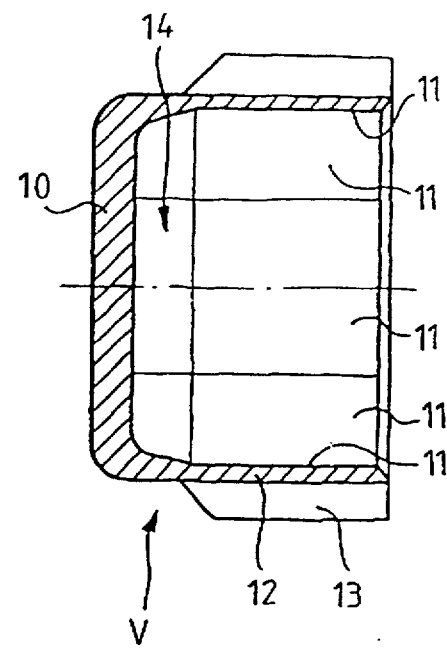
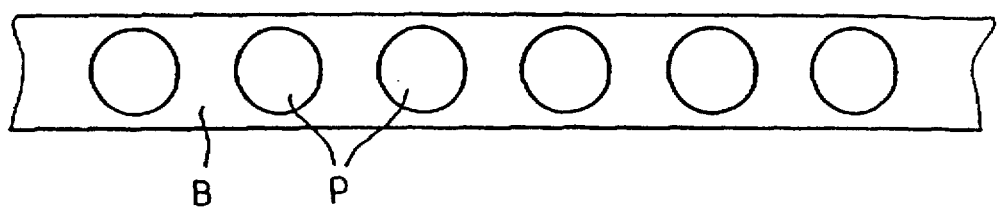
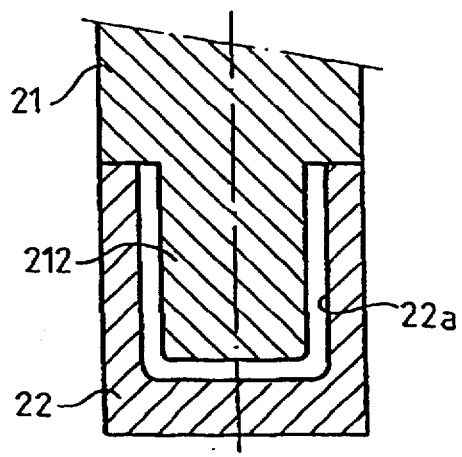

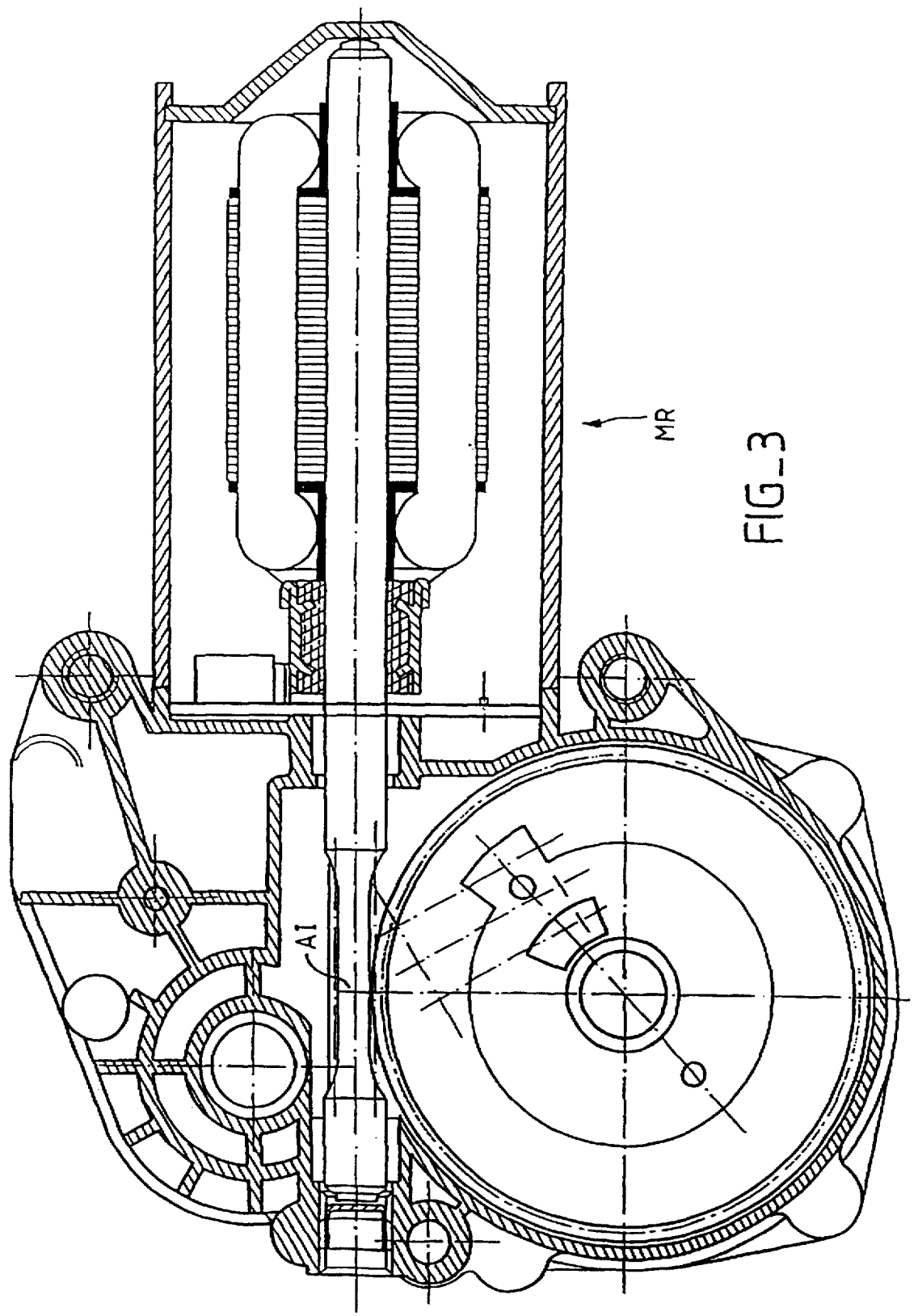
FIG_3

SHAFT ABUTMENT SCREW, ESPECIALLY FOR AN ELECTRIC MOTOR, AND A METHOD OF MAKING SUCH A SCREW

FIELD OF THE INVENTION

The present invention relates, in general terms, to shaft abutment screws, and more particularly to a method of making a novel shaft abutment screw intended, especially, for use in conjunction with the armature shaft of an electric motor. The invention also relates to shaft abutment screws per se.

BACKGROUND OF THE INVENTION

In the current state of the art, and in particular that of motorised reduction units commonly used as screen wiper drive units for driving the wipers for a windshield or rear window of a vehicle, a screw is provided against which the armature shaft makes endwise abutment. The purpose of this screw is to prevent any axial displacement of the armature shaft, while at the same time minimising any resistance to rotation of the latter. Such screws are currently made by machining in steel. Such an abutment screw is in the form of a solid, generally cylindrical body, which has an external screw thread and a radial terminal face, in which a recess is formed for receiving a screw driving tool.

These known shaft abutment screws do however have a number of drawbacks. First, they are expensive to make, due to the machining operations required. Secondly, they are heavy. Thirdly, they only have mediocre corrosion resistance, and in particular they give rise to the risk of increasing friction occurring between the terminal abutment surface of the screw and the associated end of the motor shaft.

Yet another disadvantage is that the screw is extremely difficult to fit using any automatic method. More precisely, the form of the screw is such that it is difficult to position, in one direction rather than the other, with respect to the screw driving tool. Finally, the above mentioned recess generally consists of a straight radial slot, for engaging a screw driving tool of the flat blade type, so that engagement of the latter with the screw head, and automatic turning of the screw by the tool as the latter is being screwed into place, are somewhat delicate or even impossible to carry out.

DISCUSSION OF THE INVENTION

An object of the present invention is to overcome the above mentioned drawbacks.

According to the invention in a first aspect, there is provided a method of making a shaft abutment screw, especially for cooperation with the armature shaft of an electric motor, wherein the method comprises the steps of:
(a) pressing out a flat blank of mild steel;
(b) carrying out a drawing operation on the blank so as to form a hollow component comprising a generally flat base wall and a generally cylindrical skirt portion circumscribing a screw driving socket;
(c) forming a screw thread on the outside of the said skirt portion; and then
(c) nitriding the component.

The thickness of the mild steel blank is preferably about 1 mm.

The said screw driving socket, made by drawing, is preferably a hexagonal socket.

According to the invention in a second aspect, there is provided a shaft abutment screw, especially for cooperation with the armature shaft of an electric motor, the abutment screw being of mild steel having a surface treated by nitriding, and comprising a base portion defining an external surface for abutment with one end of a said shaft, a skirt portion extending from the base portion, a screw driving socket defined within the skirt portion, and a screw thread extending around the skirt portion.

The transition between the base portion and the skirt portion is preferably rounded.

The socket is preferably a hexagonal socket.

Further features, objects and advantages of the present invention will appear more clearly on a reading of the following detailed description of a preferred embodiment of the invention, which is given by way of non-limiting example only and with reference to the accompanying drawings.

BRIEF DESCRIPTION OF THE DRAWINGS

FIG. 1 is an end view of a shaft abutment screw in accordance with the invention, seen looking on to its hexagonal socket.

FIG. 2 is a view in axial cross section of the shaft abutment screw of FIG. 1.

FIG. 3 is a view in axial cross section of a screen wiper drive unit equipped with a screw of the kind shown in FIGS. 1 and 2.

FIG. 4 is a plan view of a strip of mild steel which is used in the method of making the screw shown in FIGS. 1 and 2.

FIG. 5 is a diagrammatic view in axial cross section showing a draw tool used in the method of manufacture of the screw of FIGS. 1 and 2.

DESCRIPTION OF A PREFERRED EMBODIMENT OF THE INVENTION

Reference is first made to FIGS. 1 and 2, which show a screw V which is intended, in particular, to be used as a shaft abutment screw to provide end thrust abutment for the armature shaft of the motor of a drive unit for driving the screen wipers of a vehicle, in particular a motor vehicle. This drive unit, which may be associated with the windshield or the rear window of the vehicle, consists of the motor and a reduction gear coupled between the motor and the screen wiper or wipers.

The abutment screw V has a generally U-shaped axial cross section as seen in FIG. 2, having a flat base portion, or base wall, 10 which defines on its outer face (on the left in FIG. 2) an abutment surface for engagement by one end of the armature shaft of the motor. The two arms of the U are defined by a generally cylindrical skirt portion 12. The skirt portion 12 defines within it a hexagonal socket having six flat sides 11, each of which terminates in an inwardly inclined, or convergent, portion 14 which is joined, through a rounded transition as shown, to the base portion 10.

A screw thread, indicated diagrammatically at 13, is formed on the cylindrical outside surface of the skirt portion 13. The screw thread 13 terminates substantially in axial alignment with the junction between the axial flat sides 11 of the socket and the convergent portion 14 of the latter.

Referring now to FIG. 3, this shows the shaft abutment screw V fitted into a threaded hole OF, into which the abutment screw V is screwed, using an appropriate standard hexagonal driving tool, to the position shown, in which it is in end engagement against a rounded end of the armature shaft Al of the motor of the screen wiper drive unit MR.

The shaft abutment screw V is made by a drawing process, with cold forming, in a metal or alloy having mechanical characteristics suitable for such treatment. Preferably the material used is mild steel having an elastic limit Re of about 300 N/mm². The use of blanking and press forming in such a material, given that the surfaces of the draw tool themselves have the required quality, enable an abutment surface (i.e. the outer surface of the base portion 10) to be given a high degree of flatness (<0.02 mm), and a very fine surface finish (Ra<0.2).

The shaft abutment screw V is formed by firstly pressing out a circular blank P from a strip B of mild steel as shown in FIG. 4. The thickness of this strip is about 1 mm. Cold forming is then carried out in one or two stages, using the draw tool shown diagrammatically in FIG. 5, which comprises a first part, or punch, 21 having a head 212 with hexagonal faces, and a second part or die 22 which is formed with a cylindrical socket 22a.

It is of course the surface quality of the radial base of the socket 22a that determines the surface quality of the abutment surface of the screw. It will also be observed here that the purpose of the rounded transition between the base portion 10 of the screw and its skirt portion 12 is to facilitate the forming operation in the press by the tool shown in FIG. 5.

Subsequently, while the screw is still in a relatively malleable state, the screw thread 13 is formed on the outside of the skirt portion 12, either using a conventional threading die, or by a machining operation.

In order to give the abutment screw V the hardness which is appropriate to the application illustrated in FIG. 3, it is subjected to a nitriding process, in a gaseous or liquid medium, after the screw thread 13 has been formed. This treatment may for example take the form of one of the treatments described in the French patent specifications numbered FR 2 579 229A, FR 2 672 059A, FR 2 679 258A, FR 2 708 623A, and FR 2 708 941A. The abutment screw made in this way has a high degree of hardness, which is typically greater than 550 HV, and increased elastic strength, typically with a coefficient of 2 to 3.

The numerous advantages of the shaft abutment screw according to the invention, and typified in the embodiment described above, and of its method of manufacture, include the following:

as compared with a traditional machined screw, the cost of the component is reduced by at least 30%;

the weight of the component is also substantially reduced, again by at least 30%;

in spite of the use of simple cold forming, excellent flatness and surface quality of the abutment surface can be obtained;

the use of nitriding enables the component to offer complete resistance to the end thrust exerted by the armature shaft, in spite of its low thickness; nitriding also enables an abutment surface to be obtained having a reduced coefficient of friction with respect to the end of the armature shaft;

the form of the hexagonal socket enables the component to be fitted in place by automatic means;

in addition, its hollow form leads to a displacement of its centre of gravity towards the base portion 10, so that these screws can be easily distributed automatically using a feeder of the vibrating bowl type for feeding an automatic driving tool by which the screw is fitted in position; and the nitriding process gives the component a high corrosion resistance, thus preventing it from deteriorating over a period of time.

The present invention is of course in no way limited to the embodiment described and shown above, and the person skilled in the art will be able to apply to it any variation or modification within the spirit of the invention.

What is claimed is:

1. A method of making a shaft abutment screw for cooperation with an armature shaft of an electric motor, wherein the method comprises the steps of:
   (a) pressing out a flat blank of mild steel;
   (b) carrying out a drawing operation on the blank so as to form a hollow component comprising a generally flat base wall and a generally cylindrical skirt portion extending from the base wall and defining a screw driving socket circumscribed by the skirt portion;
   (c) forming a screw thread on the outside of the said skirt portion; and then
   (d) nitriding the component.

2. A method according to claim 1, wherein the mild steel blank has a thickness of about 1 mm.

3. A method according to claim 1, wherein the said screw driving socket formed by drawing is a hexagonal socket.

* * * * *